(12) United States Patent
Huang et al.

(10) Patent No.: US 9,476,764 B2
(45) Date of Patent: Oct. 25, 2016

(54) WAVEFRONT ADJUSTMENT IN EXTREME ULTRA-VIOLET (EUV) LITHOGRAPHY

(71) Applicant: Taiwan Semiconductor Manufacturing Co., Ltd., Hsin-chu (TW)

(72) Inventors: Chia-Ching Huang, Su-ao Township (TW); Chia-Hao Hsu, Hsinchu (TW); Tzu-Hsiang Chen, Zhubei (TW); Chia-Chen Chen, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 187 days.

(21) Appl. No.: 14/022,355

(22) Filed: Sep. 10, 2013

(65) Prior Publication Data

US 2015/0069253 A1   Mar. 12, 2015

(51) Int. Cl.
| | |
|---|---|
| *G01J 1/42* | (2006.01) |
| *G02F 1/29* | (2006.01) |
| *G02B 5/08* | (2006.01) |
| *G02B 27/00* | (2006.01) |
| *G02F 1/21* | (2006.01) |

(52) U.S. Cl.
CPC .............. *G01J 1/429* (2013.01); *G02B 5/0816* (2013.01); *G02B 27/0068* (2013.01); *G02F 1/29* (2013.01); *G02F 1/21* (2013.01); *G02F 2203/24* (2013.01)

(58) Field of Classification Search
CPC .............. G01J 1/429; G01J 1/58; G01J 1/02; G01J 1/04; G01N 21/33
See application file for complete search history.

(56) References Cited

U.S. PATENT DOCUMENTS

| | | | |
|---|---|---|---|
| 4,875,765 | A | 10/1989 | Vandenberg et al. |
| 5,684,566 | A | 11/1997 | Stanton |
| 5,793,473 | A | 8/1998 | Koyama et al. |
| 5,888,675 | A | 3/1999 | Moore et al. |
| 5,986,795 | A | 11/1999 | Chapman et al. |
| 6,840,638 | B2 | 1/2005 | Watson |

(Continued)

FOREIGN PATENT DOCUMENTS

EP    0793120 A1 *  9/1997  ......... G02B 26/0816

OTHER PUBLICATIONS

U.S. Appl. No. 14/029,844, filed Sep. 18, 2013. 24 Pages.

(Continued)

*Primary Examiner* — David Porta
*Assistant Examiner* — Mamadou Faye
(74) *Attorney, Agent, or Firm* — Eschweiler & Associates, LLC (57) ABSTRACT

Some embodiments of the present disclosure related to a method to form and operate the reflective surface to compensate for aberration effects on pattern uniformity. In some embodiments, the reflective surface comprises a mirror of within reduction optics of an EUV illumination tool. In some embodiments, the reflective surface comprises a reflective reticle. An EUV reflective surface topography comprising a reflective surface is disposed on a surface of a substrate, and is manipulated by mechanical force or thermal deformation. The substrate includes a plurality of cavities, where each cavity is coupled to a deformation element configured to expand a volume of the cavity and consequently deform a portion of the reflective surface above each cavity, for local control of the reflective surface through thermal deformation of a resistive material subject to an electric current, or mechanical deformation due to pressurized gas within the cavity or a piezoelectric effect.

20 Claims, 7 Drawing Sheets

(56) References Cited

U.S. PATENT DOCUMENTS

| | | | |
|---|---|---|---|
| 6,842,277 B2 | 1/2005 | Watson | |
| 6,897,940 B2 | 5/2005 | Sogard | |
| 8,029,947 B2 | 10/2011 | Hickman | |
| 8,284,379 B2 | 10/2012 | Phillips | |
| 8,555,208 B2 | 10/2013 | Hickman | |
| 2006/0216912 A1* | 9/2006 | Bristol et al. | 438/471 |
| 2007/0165312 A1* | 7/2007 | Aoki | G02B 26/0825 359/846 |
| 2007/0253070 A1 | 11/2007 | Venema | |
| 2010/0033704 A1* | 2/2010 | Shiraishi | 355/71 |
| 2010/0071720 A1* | 3/2010 | Ehm et al. | 134/2 |
| 2010/0284015 A1 | 11/2010 | Sewell | |
| 2010/0295088 A1* | 11/2010 | D'Evelyn et al. | 257/99 |
| 2011/0292363 A1 | 12/2011 | Ivey et al. | |
| 2012/0141922 A1* | 6/2012 | Deweerd | 430/5 |

OTHER PUBLICATIONS

U.S. Appl. No. 14/051,683, filed Oct. 11, 2013. 29 Pages.
Notice of Allowance Dated Jan. 22, 2015 U.S. Appl. No. 14/051,683.
Notice of Allowance Dated Mar. 28, 2016 U.S. Appl. No. 14/029,844.

* cited by examiner

WAVEFRONT ADJUSTMENT IN EXTREME ULTRA-VIOLET (EUV) LITHOGRAPHY

BACKGROUND

The following disclosure relates to extreme ultra-violet (EUV) lithography and methods to compensate for ray aberration while maintaining manufacturing throughput for semiconductor fabrication process.

DETAILED DESCRIPTION

The present disclosure will now be described with reference to the drawings wherein like reference numerals are used to refer to like elements throughout, and wherein the illustrated structures are not necessarily drawn to scale. It will be appreciated that this detailed description and the corresponding figures do not limit the scope of the present disclosure in any way, and that the detailed description and figures merely provide a few examples to illustrate some ways in which the inventive concepts can manifest themselves.

Figure 1A:
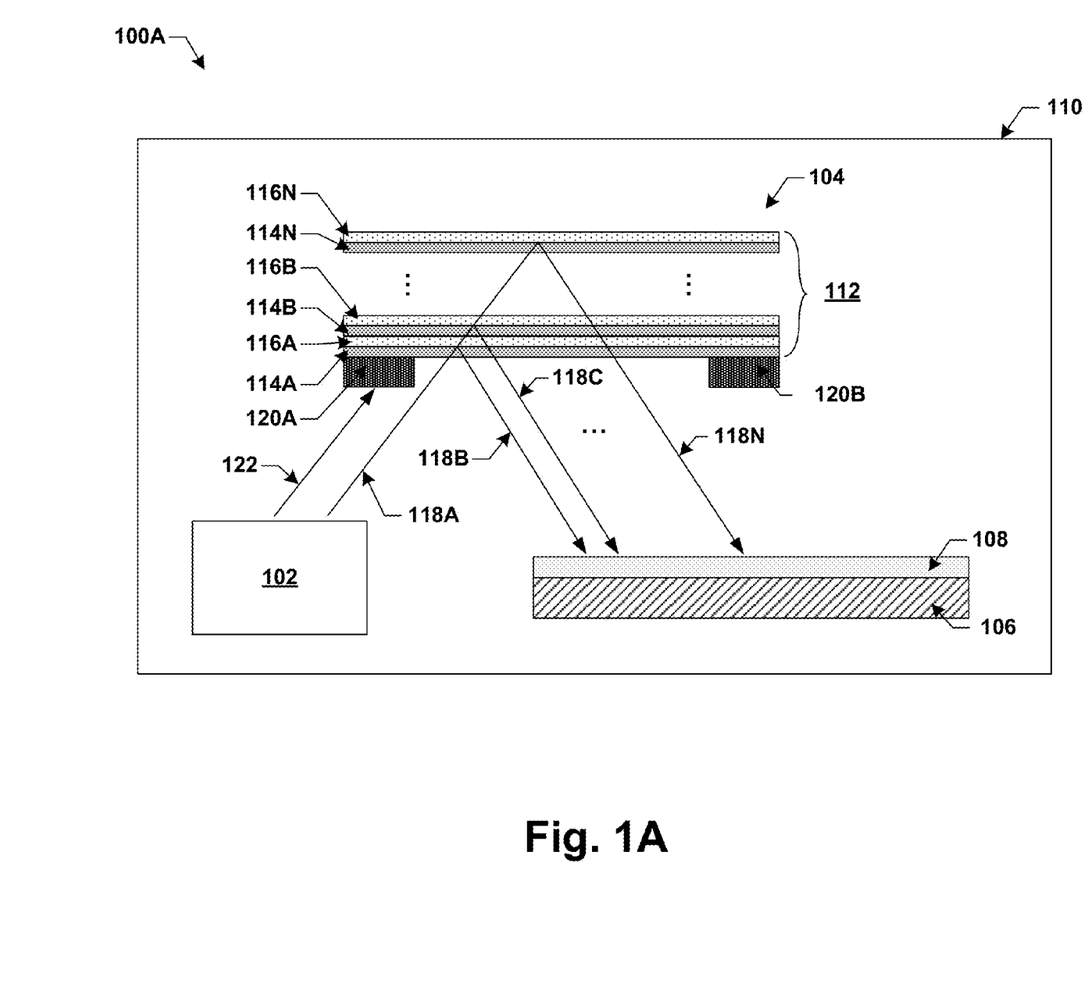
FIGS. 1A-1C illustrate EUV illumination tools and ray aberration.

To achieve continued device scaling in next-generation semiconductor technology nodes in accordance with Moore's Law beyond the limits of optical lithography tools, EUV lithography may be employed. FIG. 1A illustrates an EUV illumination tool 100A, comprising a radiation source 102 configured to supply radiation to a reticle 104 which is reflects the radiation to a surface of a semiconductor workpiece 106 to form a pattern on the workpiece. The radiation source 102 may comprise a synchrotron. Alternatively, the radiation source 102 may comprise a plasma source such as ionized xenon (Xe) or tin (Sn) produced by a laser or thermal excitation, where electrons bound to the positive ions of the plasma are removed. The radiation source 102 emits EUV radiation with wavelengths in a range of about 10 nm to about 130 nm. The EUV radiation is directed by source collector optics towards the reticle 104.

Because EUV radiation is readily absorbed, the EUV illumination tool 100A is housed within a vacuum chamber 110. The reticle 104 includes a multilayer mirror 112 comprising a plurality of reflective layers 114A-114N separated by a plurality of spacer layers 116A-116N. The reflective layers 114A-114N may comprise molybdenum (Mo) or ruthenium (Ru) and the spacer layers 116A-116N may comprise silicon (Si). The multilayer mirror 112 reflect light by means of Bragg interference between multi-interlayer interference formed between the reflective and spacer layers 114A-114N, 116A-116N, where a first incident ray 118A of radiation is partially reflected at a first interlayer interface formed between a first reflective layer 114A and a first spacer layer 116A, resulting in a first reflected ray 118B incident upon the surface of the semiconductor workpiece 106. The first incident ray 118A is also partially transmitted by the first reflective and spacer layers 114A, 116A, and partially reflected at a second interlayer interface formed between a second reflective layer 114B and a second spacer layer 116B, resulting in a second reflected ray 118C, and so on, at all reflective and spacer layer interfaces within the multilayer mirror 112 until a final reflected ray 118N is produced by a final interlayer interface between $n^{th}$ reflective and spacer layers 114N, 116N. Bragg interference within the multilayer mirror 112 results a peak reflectance wavelength of the reflected rays 118B-118N of about a 13.5 nm compared to about a 193 nm wavelength lower bound of current immersion optical lithography techniques.

The multilayer mirror 112 is capped with Mo or Ru to prevent oxidation. To produce the pattern, absorption features 120A, 120B are placed on a surface of the multilayer mirror 112 and configured to absorb the radiation (i.e., a second incident ray 122 of radiation), such that the reflected rays form the pattern on a layer of photoresist 108 disposed on a surface of the semiconductor workpiece 106, which may then be transferred to the semiconductor workpiece 106 by an etch process.

Figure 1B:
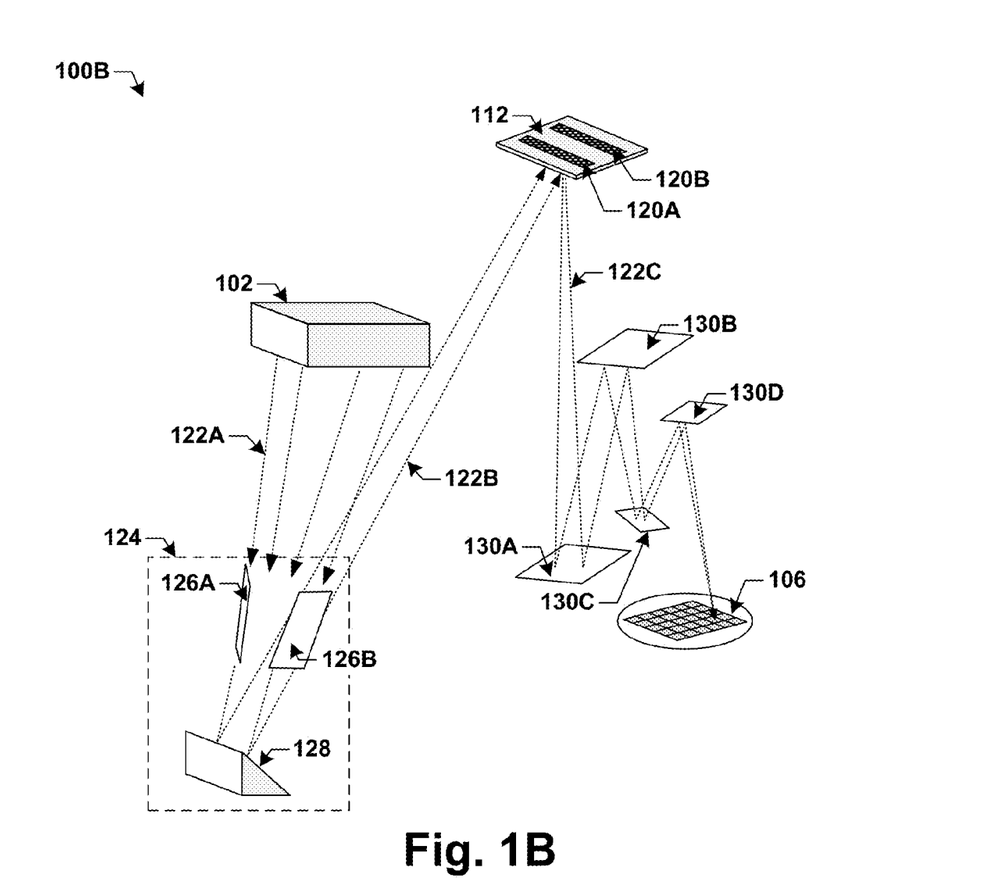

For the embodiments of FIG. 1A, a single reflective surface (i.e., multilayer mirror 112) is shown between the radiation source 102 and the semiconductor workpiece 106. FIG. 1B illustrates a more detailed embodiment of an EUV illumination tool 100B, comprising a radiation source 102 configured to supply incident radiation 122A to a condenser 124. The condenser 124 comprises first and second surfaces 126A, 126B configured to focus the incident radiation 122A, and a reflector 128, configured to reflect the focused incident radiation 122B towards the multilayer mirror 112, which is then reflected in a manner as described in the embodiments of FIG. 1A. Upon reflection by the multilayer mirror 112, the reflected radiation 122C is filtered through reduction optics, which utilizes a series of first through forth mirrors 130A-130D. The first through forth mirrors 130A-130D serve as lenses which reduce a size the pattern carried by the reflected radiation 122C (e.g., to about 25% of its original size), which then patterns the surface of the semiconductor workpiece 106.

Figure 1C:
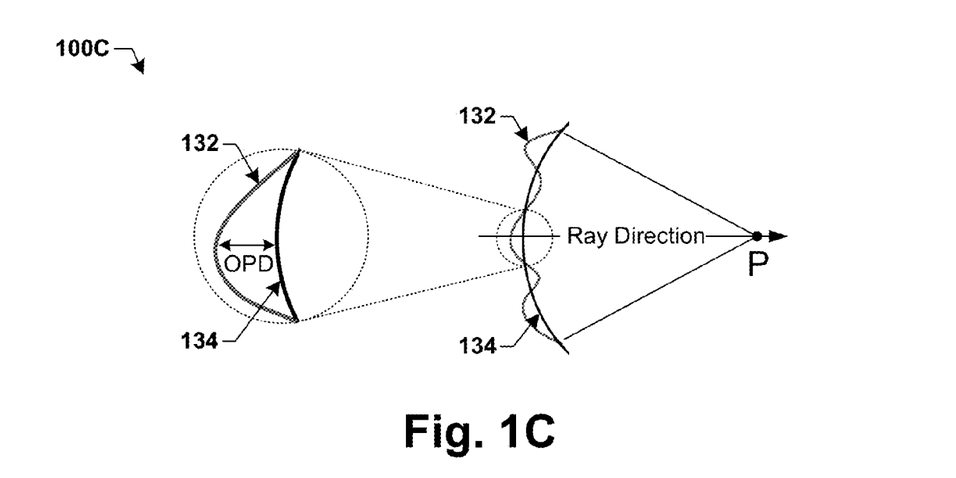

FIG. 1C illustrates some aspects of ray aberration 100C, which is the failure of focused rays to meet the same point (P). Wavefront aberration is a measure of the departure of the wavefront shape 132 from the perfect spherical form 134 of an ideal wavefront, and is defined as the difference in optical path length (OPD) between the wavefront and the reference sphere, measured along the ray direction (i.e., the direction of propagation of the wave). Wavefront aberration may result from the imperfections within the radiation source 102, or from defects within the multilayer mirror 112 (e.g., contaminate particles, etc.) which distorts the ideally flat interlayer interface and result in non-uniform reflection of an incident ray. More commonly, wavefront aberration results from distortion on an ideally flat surface of one or more of the first through forth mirrors 130A-130D of the reduction optics. This type of aberration in EUV lithography is enhanced by about 10 times over immersion optical lithography due to the relative impact on 13.5 nm vs. 193 nm nominal wavelength, and results in a degradation in pattern uniformity such as across-field critical dimension (CD) shape bias, CD variation, etc. The aberration effects can be monitored with an industry-standard tool such as a Integrated Lens Interferometer At Scanner (ILIAS) and quantified as Zernike polynomials, or by observing the degradation in pattern uniformity with a scanning electron microscope or other imaging tool.

Accordingly, some embodiments of the present disclosure related to a reflective surface and a method to form and operate the reflective surface to compensate for aberration effects on pattern uniformity. In some embodiments, the reflective surface comprises a mirror of within reduction optics of an EUV illumination tool. In some embodiments, the reflective surface comprises a reflective reticle. An EUV reflective surface topography comprising a reflective surface is disposed on a surface of a substrate, and is manipulated by mechanical force or thermal deformation. The substrate includes a plurality of cavities, where each cavity is coupled to a deformation element configured to expand a volume of the cavity and consequently deform a portion of the reflective surface above each cavity, for local control of the reflective surface through thermal deformation of a resistive material subject to an electric current, or mechanical deformation due to pressurized gas within the cavity or a piezoelectric effect.

Figure 2A:
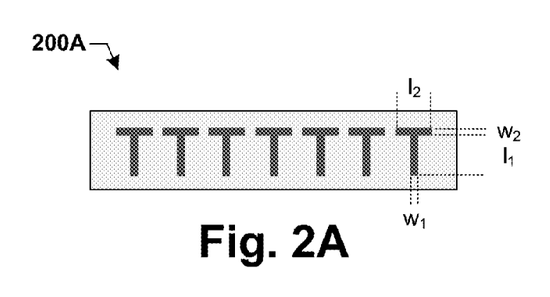
FIGS. 2A-2G illustrate some embodiments of a reflective surface disposed on a substrate comprising a plurality of cavities configured to deform a portion of the reflective surface above a respective cavity.
Figure 2B:
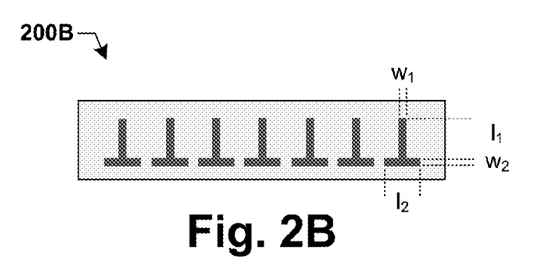
Figure 2C:
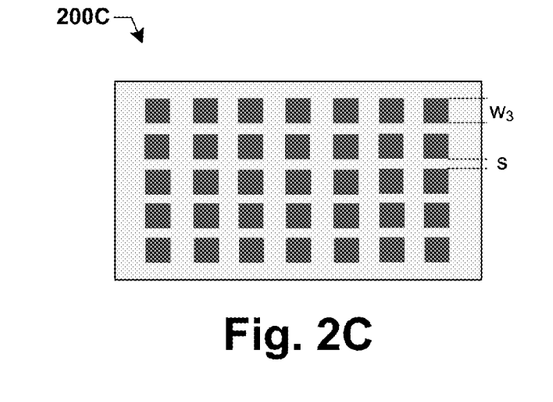
Figure 2D:
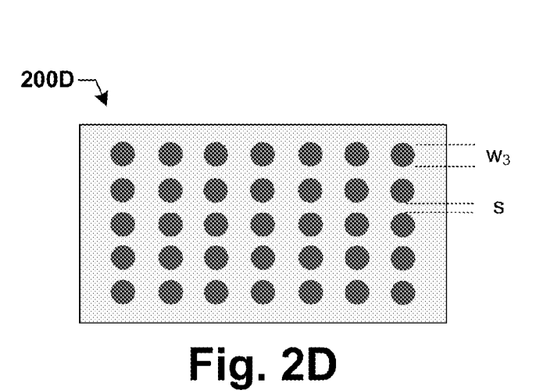
Figure 2E:
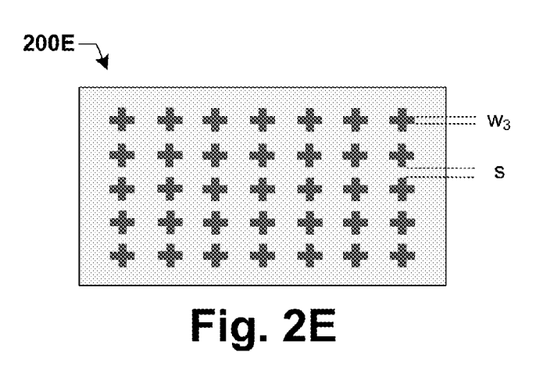

FIG. 2A illustrates a side view of some embodiments of a substrate 200A comprising a plurality of cavities of exemplary geometries. Each cavity is comprises a vertical trench of a first width ($w_1$) and a first length ($l_1$) intersecting a horizontal trench of a second width ($w_2$) and a second length ($l_2$) near a top surface of the substrate, where all dimensions are on the order of microns (i.e., less than about 100 micrometers). FIG. 2B illustrates a side view of a substrate 200B comprising a plurality of cavities which are oriented similar to those of FIG. 2A, where the horizontal trenches reside near a bottom surface of the substrate. FIGS. 2C-2E illustrate top views of some embodiments of trenches of a third width ($w_3$) and space (s) on the order of microns, comprising various geometries including, but not limited to, a square (FIG. 2C), a circle (FIG. 2D), and a cross (FIG. 2E) which represent a top view of the horizontal trenches.

While embodiments of FIGS. 2A-2E represent some exemplary substrate cavity geometries, other geometries may be anticipated by one of ordinary skill in the art which can effectively deform the surface of the substrate. In general, the cavities may comprise an arbitrary geometry. In some embodiments, substrates 200A-200E are composed of an insulating material comprising an ultra low expansion (ULE) material such as comprises silicate glass configured to exhibit minimal thermal expansion under elevated temperature.

Figure 2F:
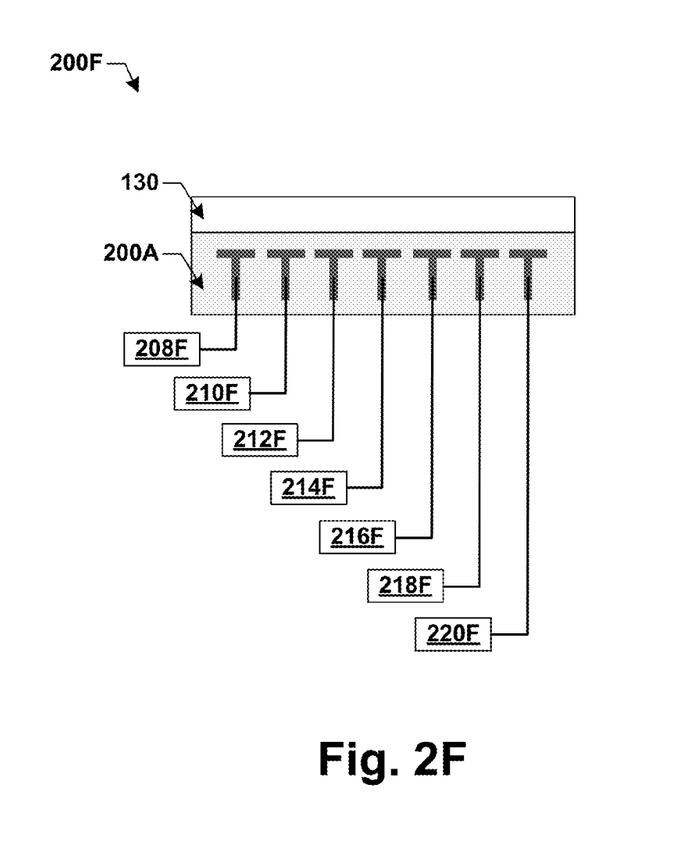

FIG. 2F illustrates a side view of some embodiments of a reflective surface 200F comprising a mirror 130 (e.g., one of the first through forth mirrors 130A-130D), disposed on a surface of the substrate 200A, but may alternatively be disposed on a substrate comprising cavities of arbitrary shape and number. Each cavity is coupled to a deformation element 208F-220F configured to expand a volume of the cavity and consequently deform a portion of the multilayer mirror 112 above the cavity.

Figure 2G:
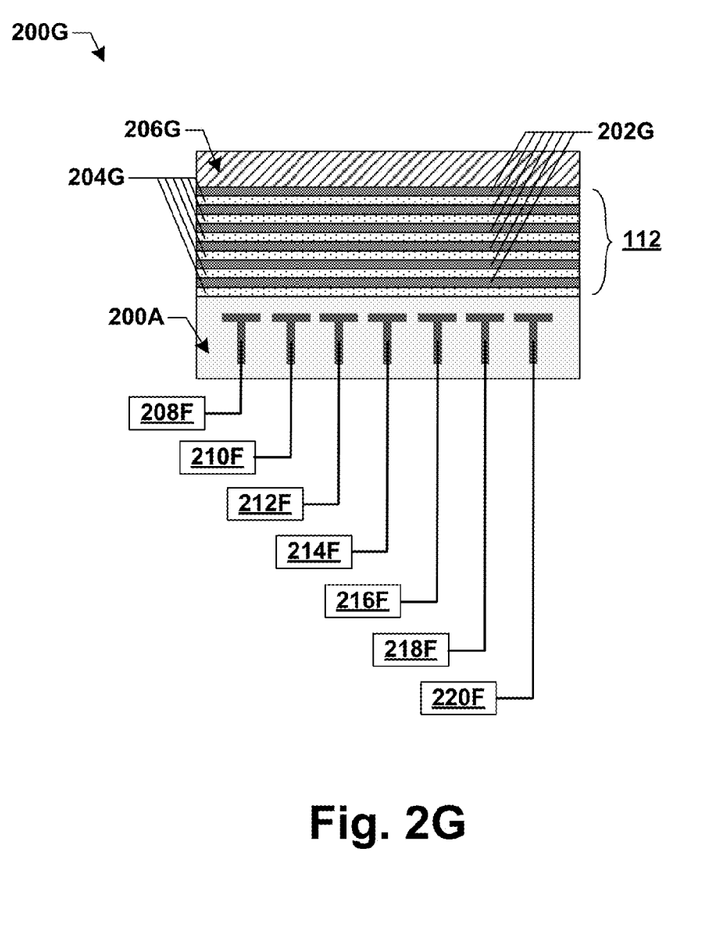

FIG. 2G illustrates a side view of some embodiments of a reflective surface 200F comprising a multilayer mirror 112 further comprising a plurality of reflective layers 202F separated by a plurality of spacer layers 204F. The multilayer mirror 112 is disposed on a surface of substrate 200A, but again may alternatively be disposed on a substrate comprising cavities of arbitrary shape and number. Each cavity is coupled to a deformation element 208F-220F. The reflective layers 202F may comprise molybdenum (Mo) or ruthenium (Ru) and spacer layers 204F comprise silicon. The multilayer mirror 112 is also capped with a protective layer 206F of Mo or Ru to prevent oxidation.

In some embodiments, deformation elements 208F-220F comprise individual gas sources configured to expand or contract the volume of the cavity by increasing or decreasing a pressure of a gas within the cavity, and consequently deform the reflective surface (e.g., mirror 130 of FIG. 2F or multilayer mirror 112 of FIG. 2G). In some embodiments, the gas sources comprise pure hydrogen, extreme-cleaned dry air (XCDA), or pure nitrogen.

In some embodiments, the plurality of cavities are filled with a resistive material, and the deformation elements 208F-220F comprise current sources configured to deliver an electric current to the resistive material within each cavity independently, resulting in a thermal expansion or contraction of the resistive material which increases or decreases the volume of each cavity. In some embodiments, the resistive material comprises silicon dioxide, copper, or aluminum.

In some embodiments the plurality of cavities are filled with a piezoelectric material and the deformation elements 208F-220F comprise current sources configured to deliver an electric current to the piezoelectric material within each cavity independently, resulting in an expansion or contraction of the piezoelectric material which increases or decreases the volume of each cavity. In some embodiments, the piezoelectric material comprises $PbTiO_3$, $PbZrO_3$, etc.

Figure 3A:
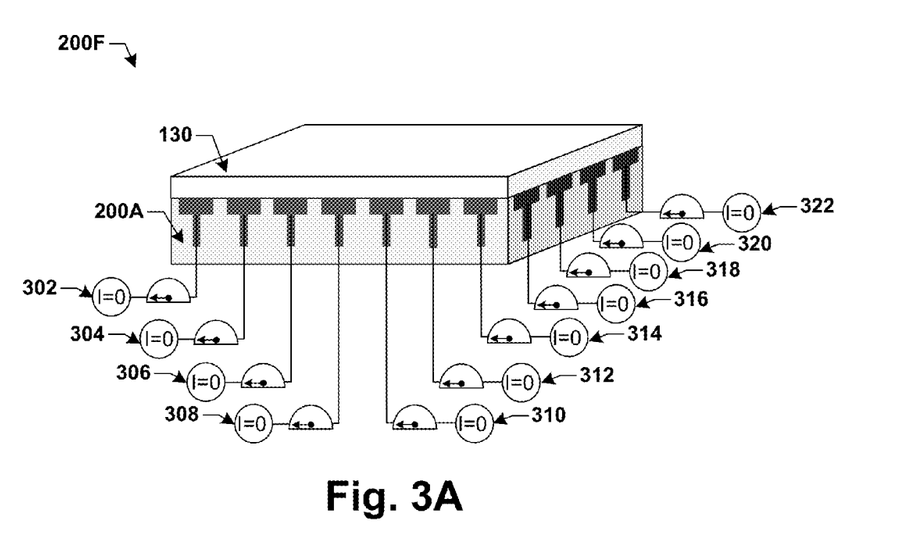
FIGS. 3A-3B illustrate some embodiments of deformation of the mirror of FIG. 2F.

FIG. 3A illustrates some embodiments of a three-dimensional (3D) view of the reflective surface 200F, where each of the plurality of cavities are wired to a current source 302-322 configured to independently deliver current to the respective cavity. In an inactive state the current sources 302-322 are configured to no current (i.e., I=0) such that the mirror 130 disposed on the surface of the substrate 200A conforms to the topology of the substrate 200A. In various embodiments, the topology of the substrate 200A may be flat, or curved (e.g., concave) in the case of a mirror 130 acting as a lens.

Figure 3B:
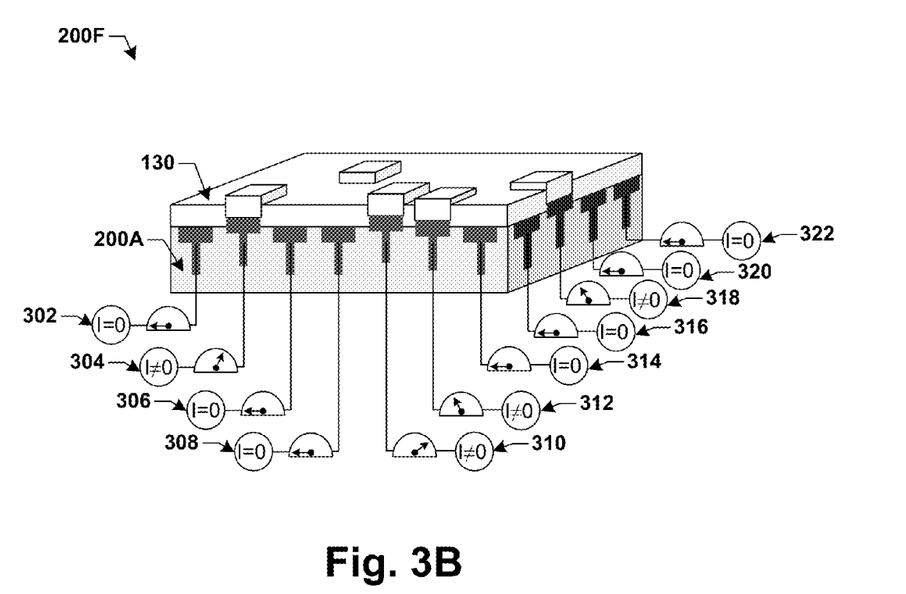

FIG. 3B illustrates some embodiments of a 3D view of the reflective surface 200F in an active state, wherein a second current source 304, fifth current source 310, a sixth current source 312, and a ninth current source 318 supply current to a resistive or piezoelectric material residing within their respective cavities, resulting in an expansion of the material due to thermal or piezoelectric expansion, which locally changes a topology of the surface of the substrate 200A and the mirror 130 to compensate for aberration effects.

Figure 4:
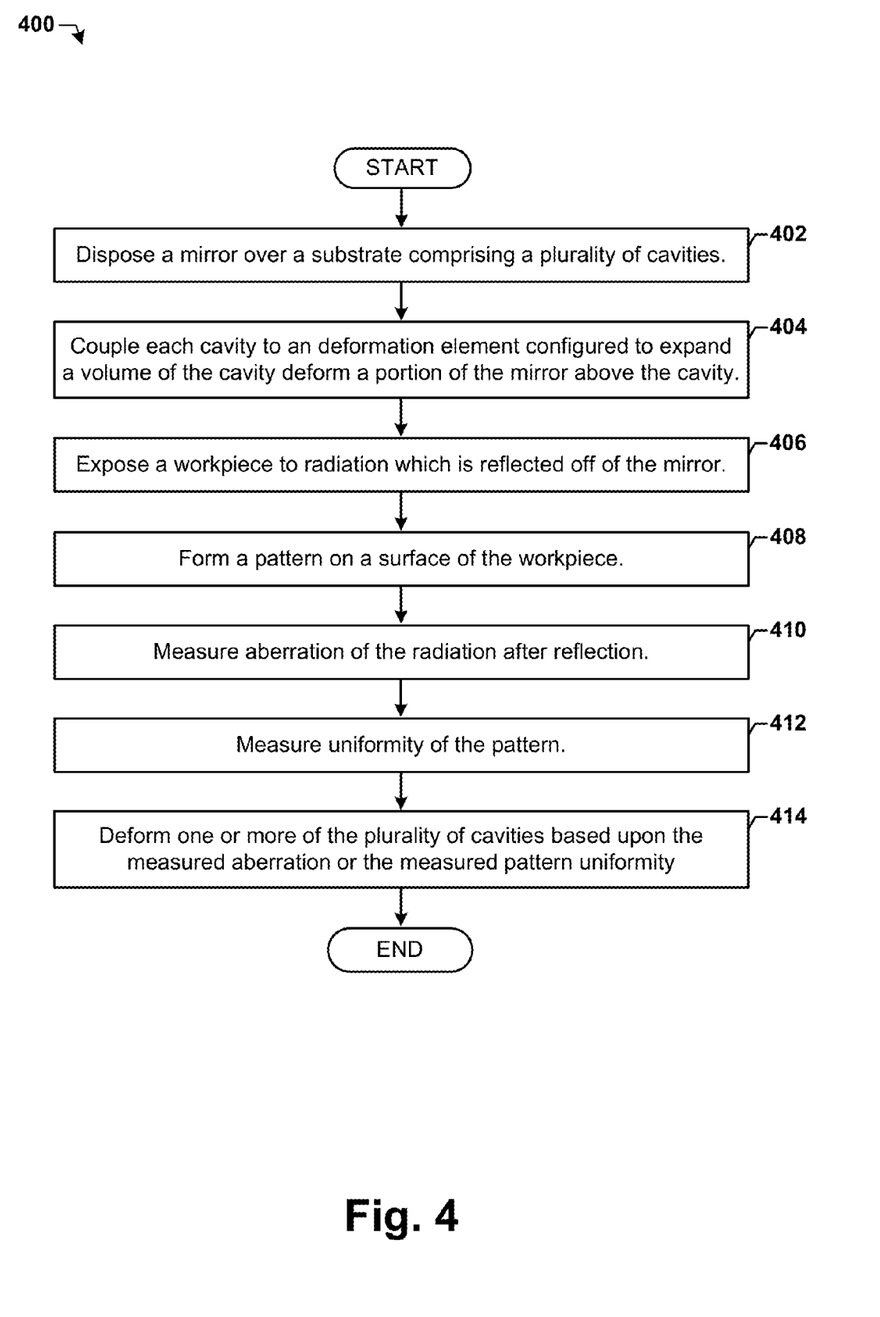
FIG. 4 illustrates some embodiments of a method of operating a reflective surface.

FIG. 4 illustrates some embodiments of a method 400 of operating a reflective surface in accordance with the embodiments of the present disclosure. While the method 400 is illustrated and described as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 402 a mirror is disposed over a surface of a substrate comprising a plurality of cavities.

At 404 each cavity is coupled to a deformation element configured to expand a volume of the cavity and a portion of the mirror above the cavity. In some embodiments, the insulating material comprises a ULE material configured to exhibit minimal thermal expansion under elevated temperature, and the plurality of cavities are filled with a resistive material configured to deform the cavity by receiving an electric current, resulting in a thermal expansion or contraction of the resistive material which increases or decreases the volume of the cavity. In some embodiments, the cavity is filled with a piezoelectric material configured to deform the cavity by receiving an electric current, resulting in a mechanical expansion or contraction of the piezoelectric material which increases or decreases the volume of the cavity. In some embodiments, the cavity is hollow, an the deformation element comprises a gas source configured to deform the cavity by increasing or decreasing a pressure of a gas within the cavity.

At 406 a semiconductor workpiece is exposed to an EUV radiation source which is supplies EUV radiation which is reflected off of the mirror. The EUV radiation source may comprise a synchrotron or a plasma source, and emits EUV radiation with a peak wavelength intensity in a range of about 13 nm to about 14 nm.

At 408 a pattern is formed on a surface of the semiconductor workpiece by reflection of EUV radiation off of the mirror.

At 410 ray aberration due to the reflection off of the mirror is measured with an ILIAS tool or comparable method.

At 412 a uniformity of the pattern us measured (e.g., CD variation, across-wafer shape bias, etc.) with an SEM or comparable method.

At 414 one or more of the plurality of cavities are deformed with their respective deformation element based upon the measured aberration or pattern uniformity to counteract the aberration effects.

Figure 5:
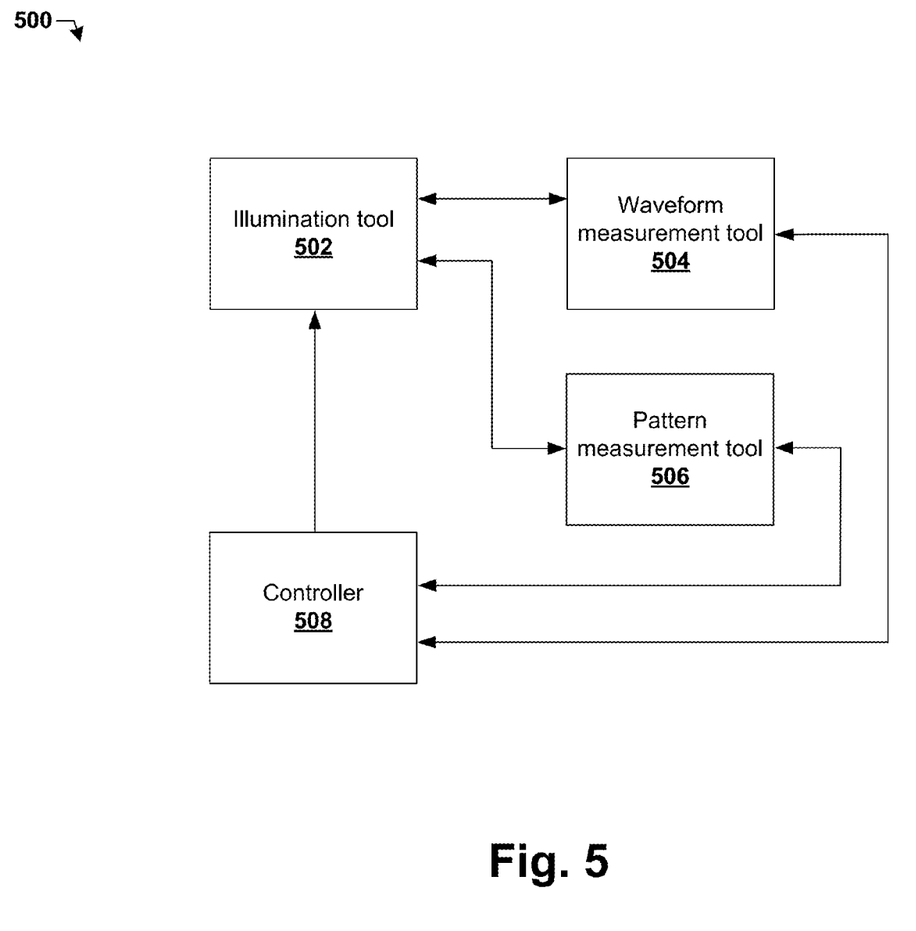
FIG. 5 illustrates some embodiments of a metrology system comprising a deformable reflective surface configured to compensate for ray aberration.

FIG. 5 illustrates some embodiments of a metrology system 500 comprising a deformable reflective surface configured to compensate for ray aberration. In some embodiments, the reflective surface comprises a mirror of within reduction optics of an EUV illumination tool. In some embodiments, the reflective surface comprises a reflective reticle. The metrology system 500 comprises an illumination tool 502 comprising a radiation source configured to supply radiation to a reflective surface which is reflects the radiation to a surface of a workpiece to form a pattern on the workpiece such as the EUV illumination tool 100A of FIG. 1A. In some embodiments, the reflective surface of the illumination tool 502 further comprises a mirror disposed on a surface of a substrate comprising a plurality of cavities, and wherein each cavity is coupled to a deformation element configured to expand a volume of the cavity and consequently deform a portion of the mirror above the cavity (e.g., the reflective surface 200F). The illumination tool 502 is coupled to a waveform measurement tool 504 such as an ILIAS tool and is configured to measure aberration of the radiation after reflection in-line and quantify the aberration with Zernike polynomials. The illumination tool 502 is also coupled to a pattern measurement tool 506 to measure a uniformity of the pattern such as a scanning electron microscope (SEM) which may be configured to measure CD uniformity off-line. The metrology system 500 further comprises a controller 508 coupled to the illumination tool 502, waveform measurement tool 504, and pattern measurement tool 506, and configured to instruct one or more of a deformation element coupled to a cavity of the reticle to deform the cavity based upon the measured aberration or measured uniformity.

Therefore, it will be appreciated that some embodiments of the present disclosure related to reflective surface and a method to form and operate the reflective surface to compensate for aberration effects on pattern uniformity. In some embodiments, the reflective surface comprises a mirror of within reduction optics of an EUV illumination tool. In some embodiments, the reflective surface comprises a reflective reticle. An EUV reflective surface topography comprising a reflective surface is disposed on a surface of a substrate, and is manipulated by mechanical force or thermal deformation. The substrate includes a plurality of cavities, where each cavity is coupled to a deformation element configured to expand a volume of the cavity and consequently deform a portion of the reflective surface above each cavity, for local control of the reflective surface through thermal deformation of a resistive material subject to an electric current, or mechanical deformation due to pressurized gas within the cavity or a piezoelectric effect.

In some embodiments the present disclosure relates to a reflective surface comprising a mirror disposed on a surface of a substrate comprising a plurality of cavities, wherein each cavity is coupled to a deformation element configured to expand a volume of the cavity and consequently deform a portion of the mirror above the cavity.

In some embodiments the present disclosure relates to a method of operating a reflective surface, comprising disposing a mirror over a surface of a substrate comprising a plurality of cavities, coupling each cavity to a deformation element configured to expand a volume of the cavity deform a portion of the mirror above the cavity, exposing a workpiece to radiation which is reflected off of the mirror, measuring aberration of the radiation after reflection, and deforming one or more of the plurality of cavities with their respective deformation element based upon the measured aberration.

In some embodiments the present disclosure relates to a metrology system, comprising an illumination tool comprising a radiation source configured to supply radiation to a reflective surface which is reflects the radiation to a surface of a workpiece to form a pattern on the workpiece, wherein the reticle comprises a mirror disposed on a surface of a substrate comprising a plurality of cavities, and wherein each cavity is coupled to a deformation element configured to expand a volume of the cavity and consequently deform a portion of the mirror above the cavity.

Although the disclosure has been shown and described with respect to a certain aspect or various aspects, equivalent alterations and modifications will occur to others of ordinary skill in the art upon reading and understanding this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several aspects of the disclosure, such feature may be combined with one or more other features of the other aspects as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A reflective surface, comprising:
a mirror disposed on a surface of a substrate comprising a plurality of cavities, wherein the plurality of cavities respectively comprise a 'T' shaped cavity having a vertical trench extending into the substrate along a first direction and a horizontal trench extending beyond sidewalls of the vertical trench along a second direction that is perpendicular to the first direction; and
an expansive material arranged within the plurality of cavities, wherein the expansive material fills an entirety of the vertical trench and a portion of the horizontal trench, wherein the expansive material is configured to expand volumes of the plurality of cavities and consequently deform portions of the mirror above the plurality of cavities.

2. The reflective surface of claim 1, wherein the mirror comprises a reflective reticle further comprising a multilayer mirror comprising a plurality of reflective layers separated by a plurality of spacer layers.

3. The reflective surface of claim 2, wherein the reflective layers comprise molybdenum or ruthenium and the spacer layers comprise silicon.

4. The reflective surface of claim 1, wherein the expansive material comprises a resistive material, and wherein the resistive material is connected to a deformation element comprising a current source configured to deliver an electric current to the resistive material, resulting in a thermal expansion or contraction of the resistive material which increases or decreases the volumes of the cavities.

5. The reflective surface of claim 1, wherein the expansive material comprising a piezoelectric material, and wherein the piezoelectric material is connected to a deformation element comprising a current source configured to deliver an electric current to the piezoelectric material, resulting in an expansion or contraction of the piezoelectric material which increases or decreases the volumes of the cavities.

6. A method of operating a reflective surface, comprising:
disposing a mirror over a first surface of a substrate comprising a plurality of cavities extending into the first surface of the substrate, wherein the plurality of cavities respectively comprise a horizontal trench extending parallel to the first surface of the substrate and a vertical trench protruding outward from the horizontal trench; coupling each cavity to a deformation element configured to expand a volume of the cavity to deform a portion of the mirror above the cavity by way of a control path extending from the cavity, through the substrate, to a second surface of the substrate opposing the first surface of the substrate; exposing a workpiece to radiation which is reflected off of the mirror; measuring aberration of the radiation after reflection; and deforming one or more of the plurality of cavities with their respective deformation element based upon the measured aberration.

7. The method of claim 6, further comprising:
forming a pattern on a surface of a substrate;
measuring a uniformity of the pattern; and
deforming the one or more of the plurality of cavities based upon the measured aberration or the measured pattern uniformity.

8. The method of claim 6, wherein the deformation element comprises a gas source, and wherein deforming a cavity comprises increasing or decreasing a pressure of a gas within the cavity with the gas source.

9. The method of claim 6, wherein the deformation element comprises a current source.

10. The method of claim 9, wherein the plurality of cavities are filled with a piezoelectric material, and wherein deforming a cavity comprises delivering an electric current to the piezoelectric material with the current source, resulting in an expansion or contraction of the piezoelectric material which increases or decreases the volume of the cavity.

11. The method of claim 9, wherein the plurality of cavities are filled with a resistive material, and wherein deforming a cavity comprises delivering an electric current to the resistive material with the current source, resulting in a thermal expansion or contraction of the resistive material which increases or decreases the volume of the cavity.

12. A metrology system, comprising:
a radiation source configured to supply radiation;
a mirror disposed on a surface of a substrate and configured to reflect the radiation to a surface of a workpiece to form a pattern on the workpiece, wherein the substrate comprises:
a plurality of cavities having horizontal trenches and vertical trenches protruding outward from horizontal trenches, wherein the horizontal trenches comprise a first plurality of horizontal trenches extending outward from first opposing sidewalls of the vertical trenches along a first direction and a second plurality of horizontal trenches extending outward from second opposing sidewalls of the vertical trenches along a second direction perpendicular to the first direction;
wherein adjacent ones of the first plurality of horizontal trenches are separated in the second direction by a first distance and adjacent ones of the second plurality of horizontal trenches are separated in the first direction by a second distance that is equal to the first distance, and
wherein each cavity is coupled to a deformation element configured to expand a volume of the cavity and consequently deform a portion of the mirror above the cavity.

13. The metrology system of claim 12, further comprising:
a waveform measurement tool configured to measure aberration of the radiation after reflection;
a pattern measurement tool configured to measures a critical dimension (CD) of a feature formed on a substrate; and
a controller coupled to the waveform measurement tool and the pattern measurement tool and configured to instruct the deformation element to deform the cavity based upon the measured aberration or the measured critical dimension.

14. The reflective surface of claim 2, wherein the horizontal trench is arranged between the vertical trench and the reflective reticle.

15. The reflective surface of claim 1, further comprising:
a conductive path extending from the expansive material within the cavities, through the substrate, to a second surface of the substrate opposing a first surface of the substrate in which the cavities are arranged.

16. The reflective surface of claim 1, wherein the expansive material completely fills the plurality of cavities.

17. The reflective surface of claim 1, wherein the horizontal trench contacts the mirror.

18. The reflective surface of claim 1, wherein the expansive material within the horizontal trench contacts the mirror.

19. The reflective surface of claim 1, wherein the 'T' shaped cavity comprises a first set of vertical sidewalls connected to a second set of vertical sidewalls by way of a surface extending horizontally between the first set of vertical sidewalls and the second set of vertical sidewalls.

20. The metrology system of claim 12,
wherein the plurality of cavities are arranged in a two dimensional grid having a first set of cavities aligned in the first direction and a second set of cavities aligned in the second direction; and
wherein the first plurality of horizontal trenches of the first set of cavities are aligned along a first line extending in the first direction and the second plurality of horizontal trenches of the second set of cavities are aligned along a second line extending in the second direction.

* * * * *